(12) United States Patent
Gorobets et al.

(10) Patent No.: US 11,708,281 B1
(45) Date of Patent: Jul. 25, 2023

(54) DEVICE FOR HYDROXYL-RADICAL-BASED WATER DISINFECTION AND PURIFICATION AND METHOD OF USE

(71) Applicant: PLASMIUS, INC, Redmond, WA (US)

(72) Inventors: Vladimir Leonidovich Gorobets, Redmond, WA (US); Andrey Makarov, Moscow (RU); George Goldman, Ramat Gan (IL); Nadezhda Gulko, Moscow (RU); Igor Mikhailovich Piskarev, Moscow (RU)

(73) Assignee: PLASMIUS, INC, Redmond, WA (US)

( * ) Notice: Subject to any disclaimer, the term of this patent is extended or adjusted under 35 U.S.C. 154(b) by 0 days.

(21) Appl. No.: 18/145,422

(22) Filed: Dec. 22, 2022

Related U.S. Application Data

(60) Provisional application No. 63/294,814, filed on Dec. 29, 2021.

(51) Int. Cl.
*C02F 1/46* (2023.01)
*C02F 1/00* (2023.01)
*C02F 1/34* (2023.01)

(52) U.S. Cl.
CPC ............ *C02F 1/4608* (2013.01); *C02F 1/001* (2013.01); *C02F 1/008* (2013.01); *C02F 1/34* (2013.01); *C02F 2201/005* (2013.01); *C02F 2201/46* (2013.01); *C02F 2209/003* (2013.01); *C02F 2209/42* (2013.01); *C02F 2303/04* (2013.01); *C02F 2305/023* (2013.01)

(58) Field of Classification Search
None
See application file for complete search history.

(56) References Cited

U.S. PATENT DOCUMENTS 6,783,676 B2   8/2004   Jensen
2006/0027463 A1   2/2006   Lavelle et al.
(Continued)

FOREIGN PATENT DOCUMENTS

EP        3303679       5/2019
KR     20100003553 A    1/2010
RU        2251533 C2   10/2005
(Continued)

OTHER PUBLICATIONS

Piskarev, I. M. "The role of ozone in chemical processes in electric discharge plasma." High Energy Chemistry 54.3 (2020): 205-209.
(Continued)

*Primary Examiner* — Richard C Gurtowski
(74) *Attorney, Agent, or Firm* — Leonid Kisselev

(57) ABSTRACT

The device provided relates to the field of water purification and disinfection. The device for water purification works by exposing water to an hydroxyl radicals and includes a corona discharge reactor, an ejector, at least one solenoid valve, control electronics, a mixing chamber. Inside the reactor there is a group of pin discharge electrodes, an earthen solid electrode, a chamber of saturated vapors of treated water, and the reactor is interfaced to the ejector. The device allows to obtain at the output of the device water with a high degree of purification, as from biological pollution, as well as to get rid of many undesirable chemical compounds present in the source water by their oxidation to safe products.

20 Claims, 6 Drawing Sheets

(56) References Cited

U.S. PATENT DOCUMENTS

2009/0159461 A1* 6/2009 McCutchen ......... B01J 19/1806
205/742
2011/0220585 A1* 9/2011 Ren .......................... C02F 9/00
210/721

FOREIGN PATENT DOCUMENTS

RU         2636076 C2   11/2017
WO    WO2016150718      9/2016

OTHER PUBLICATIONS

Piskarev, I. M. "Comparison of Direct and Indirect Effect of Spark Discharge Plasma and UV Lamp Radiation on Water and an Aqueous Solution of Methyl Orange." IEEE Transactions on Plasma Science 48.4 (2020): 1116-1121.
http://web.archive.org/web/20201101124929/https://en.wikipedia.org/wiki/Vacuum_ejector, cached on Nov. 1, 2020.
http://web.archive.org/web/20211224174102/https://en.wikipedia.org/wiki/Cavitation, cached on Dec. 24, 2021.

* cited by examiner

100

100

100

100

DEVICE FOR HYDROXYL-RADICAL-BASED WATER DISINFECTION AND PURIFICATION AND METHOD OF USE

CROSS-REFERENCE TO RELATED APPLICATIONS

This non-provisional patent application claims priority under 35 U.S.C. § 119(e) to U.S. Provisional Patent application, Ser. No. 63/294,814, filed Dec. 29, 2021, the disclosure of which is incorporated by reference.

FIELD

This application relates in general to healthcare technology, and, in particular, to a device for hydroxyl-radical-based based water disinfection and purification and method of use.

BACKGROUND

Clean water is essential for maintaining one's well-being. With the increased impact of water-borne and potentially water-borne pathogens, natural disasters, man-made environmental disasters, and other events that can jeopardize water quality, the efficiency, safety, and effectiveness of water purification and disinfection technology becomes of prime importance. Currently, there is significant room for improvement of such technology.

For example, a device for treating water with ozone for the purpose of water disinfection is described in Russian Federation Patent No. RU2636076C2, entitled "Method of photochemical water purification and a device for its implementation), granted Nov. 20, 2017, the disclosure of which is incorporated by reference. The device includes flow-through type ultraviolet emitters for the production of ozone. Disinfection occurs by mixing the ozone with water. The disadvantage of this device is that because ozone is a selective oxidizing agent, the ozone treatment could cause an appearance of oxidation products that are more toxic than those that need to be removed from water. Further, due to ozone being a selective oxidizing agents, many compounds whose removal from water could be desired are not affected by ozone to a desired extent. Also, the described use of ozone for water purification is associated with high energy costs for the ozone production and could be subject to strict regulations regarding the quality of air or oxygen needed to produce the ozone.

A further apparatus for water treatment using ozonation and electrolytic chlorination is described in U.S. Patent No. US20060027463A1, published Feb. 9, 2006, the disclosure of which is incorporated by reference. The water treatment apparatus utilizes ozonation and electrolytic chlorination, with the products of the electrochemical reaction of obtaining chlorine from table salt being added to ozone. In this approach, the chlorine gas obtained through electrolysis provides additional disinfection of the water. The disadvantage of this approach is the use of oxidizing agents such as chlorine. An additional difficulty is the necessity to get rid of residual chlorine in the resulting water. Further, this approach is associated with large energy costs.

A further water treatment device that uses an ozone-hydroxyl mixture is described in the European Patent Office Patent No. EP3303679, granted Jun. 5, 2019, entitled "HYDROXYL INJECTION SYSTEM," the disclosure of which is incorporated by reference. The ozone-hydroxyl mixture is obtained in water vapors using irradiation of titanium dioxide with ultraviolet radiation. Subsequently, this mixture is transported to a water treatment system. The disadvantage of this approach is the gradual contamination of the surface of the titanium dioxide catalyst with contaminants contained in the water being treated, which leads to a sharp reduction in its efficiency and, accordingly, the production of hydroxyl radicals. Further, the main drawback of this approach is that the lifetime of hydroxyl radicals is on the order of microseconds and they degrade in the system while they are being delivered to the treated water.

A further water treatment technique is described in U.S. Patent No. U.S. Pat. No. 6,783,676B2, entitled "Pre- and post-treatment system and method for aquatic plant filtration using ozone", issued Aug. 31, 2004, the disclosure of which is incorporated by reference. The system is designed to obtain purified water used for power supply plants. The disadvantages of this solution is the high energy requirements and the selective disinfecting effect of ozone.

A further water treatment device is described in South Korean patent KR20100003553A, granted Sep. 1, 2010, entitled "Water Purifier Using Advanced Oxidation Process. The device includes a hydrogen peroxide generator, an ozone production unit, and an ultrasonic mixing chamber. Hydroxyl radicals are produced by exposing ozone to hydrogen peroxide vapor. The disadvantage of the solution is the complexity of the design, the use of hydrogen peroxide, and an ozone generator.

A further water treatment device is described in International Publication No. WO2016150718A1, published Sep. 29, 2016, "UV-C water purification device," the disclosure of which is incorporated by reference. The device is based on the improved technology of applying ultraviolet radiation to the ozone-forming gas and to treated water. The disadvantages of this device are the low power of the produced ultraviolet light as a result of the use of LEDs. Other disadvantages include the high cost of hard UV LEDs, small volumes of ozonized water, a complex optical system needed for the application of ultraviolet radiation, and the necessity for the presence of windows made of material with good conductivity of hard ultraviolet.

A further water treatment device is described in Russian Federation Patent No. RU2251533C2, granted May 10, 2005, entitled "Method of water purification." The device produces an ozone-hydroxyl mixture by applying an electric discharge over a liquid surface and subsequently transporting the hydroxyls into the treated water. The disadvantage of this device is the lack of the ability to control the current in the discharge and automatically change the current to prevent spark holes on the ground electrode.

Accordingly, there is a need for an energy-efficient, highly-controllable, and effective way to disinfect and purify water.

SUMMARY

The device described below is intended for purification and disinfection of water (drinking, sewage, etc.) and can be used in industrial enterprises, in agriculture, medical, special institutions and in everyday life. Water purification occurs under the influence of cold plasma obtained in saturated vapors of water under the action of an electric nanosecond discharge. As a result of the implementation of the device and method of use of the device, the efficiency of water purification increases, energy costs are reduced while simplifying the water purification process. The technical result of the invention is the implementation of a method for treating water in order to purify it from various types of contaminants by oxidation of pollutants with hydroxyl radicals OH to their neutral compounds, as well as to increase the efficiency, safety and efficiency of the device.

In one embodiment, a device for hydroxyl-radical-based water disinfection is provided. The device include: an ejector into which water that includes contaminants enters under a pressure and with a speed and which accelerates the water to a further speed greater than the speed, wherein the accelerated water creates a region of a further pressure lower than the pressure at a boundary of flow of the accelerated water; a reaction chamber including a plurality of electrodes which produce a corona discharge upon an application of high voltage nanosecond duration pulses to the electrodes, wherein the corona discharge produces plasma-chemical reaction products including hydroxyl radicals when performed in a presence of a water vapor, wherein a pressure in the reaction chamber is greater than the lower pressure, and wherein the reaction chamber is interfaced to the lower pressure region and the plasma-chemical reaction products enter the accelerated water through the interface to the lower pressure region; and a mixing chamber interfaced to the ejector, the reaction chamber, and to an outlet, wherein at least a portion of the contaminants encounter at least some of the reaction products in the mixing chamber and the at least some reaction products at least partially oxidize the encountered contaminants, and wherein the water within the mixing chamber forms the water vapors that enter the reaction chamber through the reaction chamber interface, and wherein the water with the oxidized contaminants exits through the outlet.

In a further embodiment, a method for hydroxyl-radical-based water disinfection is provided. Water that includes contaminants under is provided into an ejector a pressure and with a speed and the water is accelerated with the ejector to a further speed greater than the speed, wherein the accelerated water creates a region of a further pressure lower than the pressure at a boundary of flow of the accelerated water. A corona discharge is produced in a reaction chamber including a plurality of electrodes by applying high voltage nanosecond duration pulses to the electrodes, wherein the corona discharge produces plasma-chemical reaction products including hydroxyl radicals when performed in a presence of a water vapor, wherein a pressure in the reaction chamber is greater than the lower pressure, and wherein the reaction chamber is interfaced to the lower pressure region and the plasma-chemical reaction products enter the accelerated water through the interface to the lower pressure region. The water is mixed with the plasma-chemical reaction products in a mixing chamber interfaced to the ejector, the reaction chamber, and to an outlet, wherein at least a portion of the contaminants encounter at least some of the reaction products in the mixing chamber and the at least some reaction products at least partially oxidize the encountered contaminants, and wherein the water within the mixing chamber forms the water vapors that enter the reaction chamber through the reaction chamber interface, and wherein the water with the oxidized contaminants exits through the outlet.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

DETAILED DESCRIPTION

The device described below allows to purify water from a variety of microorganism and chemical contaminants, maintain the initial salt composition, ensure a pH level of 6.8-7.2n The purification is performed using hydroxyl radicals, which are generated in an energy-efficient way that prolongs their life and allows them to be mixed with water that needs to be purified in a way that allows to achieve an oxidation effect exceeding that achievable by ozone.

Figure 1:
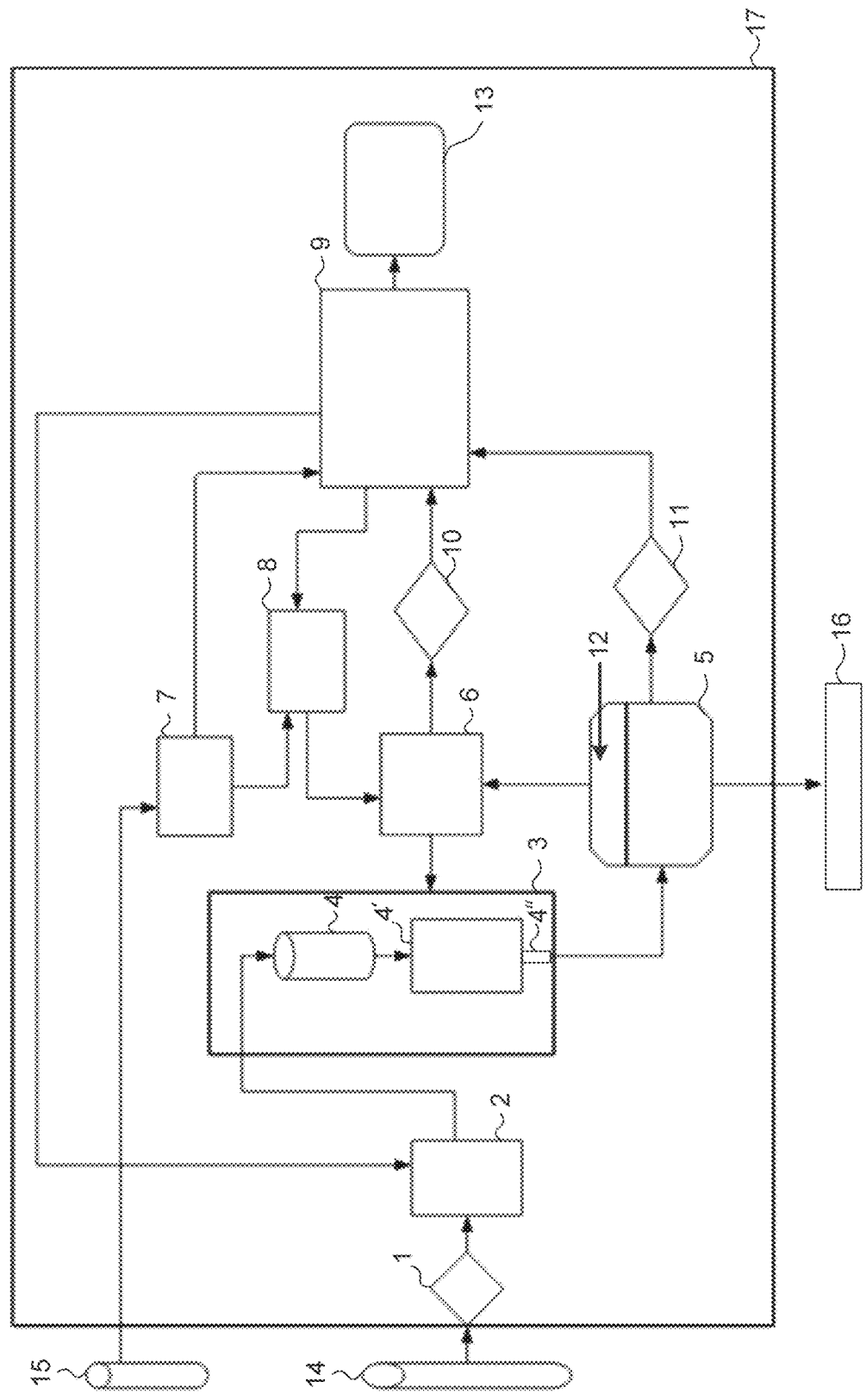
FIG. 1 is a block diagram showing a device for ozone-hydroxyl-mixture-based water disinfection and purification in accordance with one embodiment.

The device works as follows:

FIG. 1 is a block diagram showing a device 100 for hydroxyl-radical-based water disinfection and purification in accordance with one embodiment. In one embodiment, the device 100 includes a housing 17 made of corrosion-resistant metal, preferably aluminum in which the blocks and controls are arranged. Water entering the inlet of the device must be at a pressure of at least 3 bar and a temperature not exceeding 30° C. Water from a water main 14 passes through the pre-treatment filter 1 for removal of mechanical contaminants and encounters at least one electro-magnetic (solenoid) valve 2 that is controlled by a microcontroller control unit 9 that includes a microcontroller. The outlet line of the solenoid valve 2 is connected to the input of an ejector 3 (also referred to as "a cavitator-ejector 3" below) that accelerates the water that enters the ejector 3.

Figure 2:
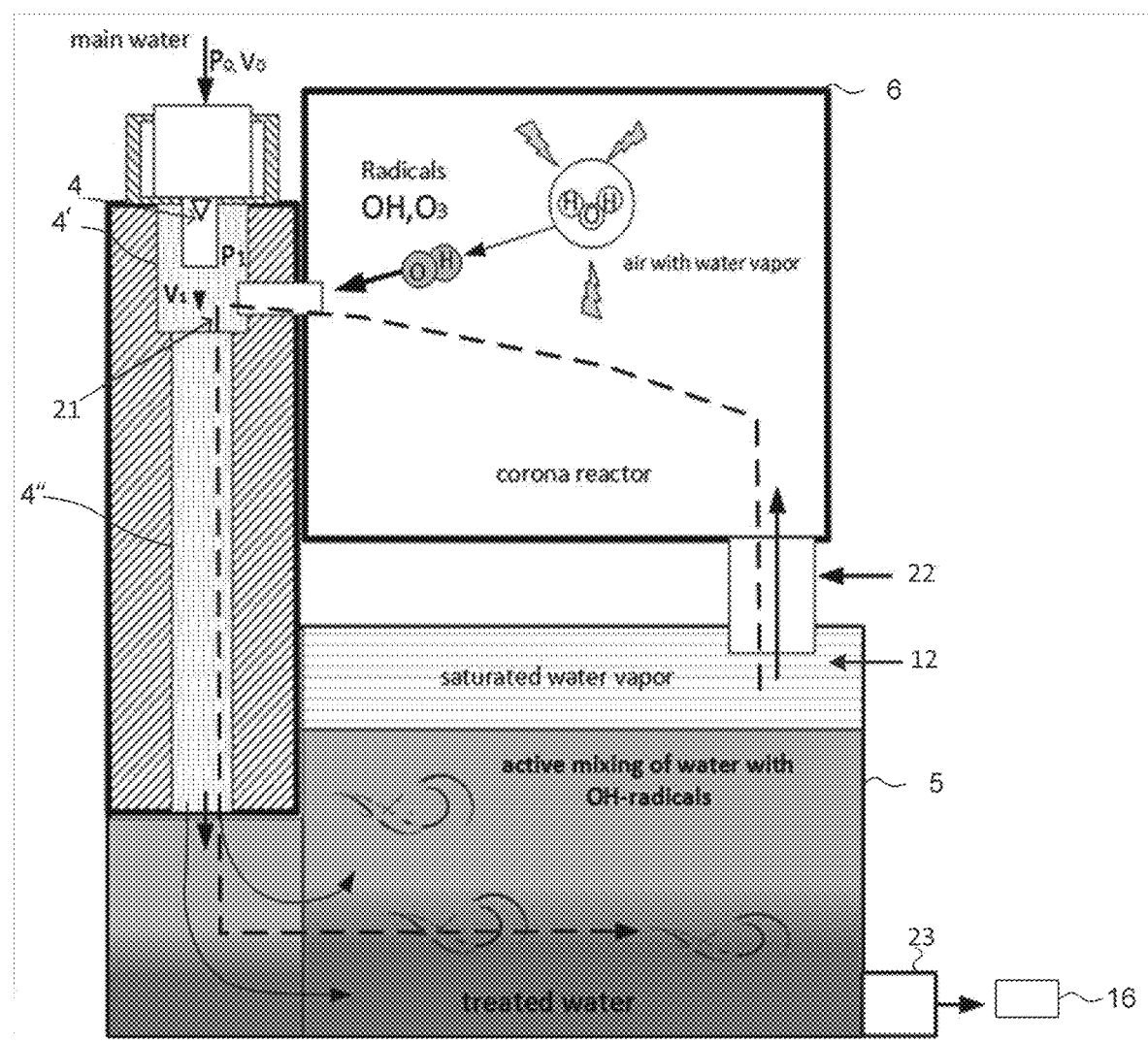
FIG. 2 is a diagram explaining the work of the ejector-cavitator of the device of FIG. 1, the path of movement of hydroxyl radicals, and of the treated water.

FIG. 2 shows the path of movement of water and OH radicals through the cavitator-ejector 3 of the device 100 of FIG. 1 in accordance with one embodiment. The ejector-cavitator 3 (also referred to as "ejector" 3) can be a steam ejector (though in a further embodiment, other types of ejectors are possible), has no moving parts, and accelerates the water due to the cavitation action caused by the structure of the ejector 3. The ejector 3 includes an input nozzle 4, an ejector mixing chamber 4' and an outlet channel 4" through which water mixed with OH radicals in the form of a water-air mixture enters the treatment and mixing chamber 5 under pressure, as further described below with reference to FIG. 2. The water that enters the ejector 3 is under pressure denoted as $P_0$ and has a velocity denoted as $V_0$. The water passes through the nozzle 4, and exits the nozzle 4 under a pressure of $P_1$ (which is significantly less than $P_0$) and with a velocity of $V_1$ (which is significantly greater than $V_0$), and under these conditions enters the ejector mixing chamber 4', where cavitation occurs.

Cavitation refers to a disruption of liquid continuity (formation of bubbles) where there is a significant reduction in local pressure, with the bubble formation within the liquid beginning even in the presence of positive pressures that are equal to or close to the pressure of saturated vapor of the liquid at the given temperature. The formed bubbles mix with the water in the ejector mixing chamber 4', and move into a section of the outlet channel 4". The outlet channel 4" can have a constant area section (where the dimensions of the section stay the same throughout the length of the section) (not shown) and a diffuser section that widens towards the end from which the water exits the ejector 3 (not shown). When the water mixed with air (from the bubbles) enters the constant area section, the water is under the pressure denoted as $P_2$, which is greater than $P_1$ and $P_0$, and has a velocity denoted as $V_2$, which is less than $V_1$. When the water-air mixture enters the diffuser section, the pressure under which the water-air section is gradually drops (such to a level below $P_0$), but still remains significantly higher than atmospheric pressure when the water-air mixture enters the treatment and mixing chamber 5. The significant pressure under which the water-air mixture enters the chamber 5 causes intensive mixing of the water and air, which causes the bubbles to rise to the top, promoting the formation of saturated water vapor above the water in the cavity 12 above the chamber 5, which enters the corona discharge reactor 6 through.

As further described below, within the reactor 6, plasma-chemical reactions occur, and the majority of the products of that reaction are gaseous hydroxyl (OH) radicals. Due to the difference in pressure and flow rates, (where $P_0$, $V_0$ are the pressure under which the water enters the ejector 3), water passing through the nozzle 4 acquires a greater speed than $V_0$, creating a region 21 of reduced pressure P' (pressure lower than $P_0$ and $P_1$) at the flow boundary. The hydroxyl radicals (and possibly other products of the plasma-chemical reactions) are drawn into the water stream due to the pressure P' being lower than the pressure inside the corona discharge reactor 6. The products of the plasma reactions are thus drawn into the treatment and mixing chamber 5 as a secondary flow, where the water is processed and mixed with OH radicals (and possibly other products of the plasma-chemical reactions), which oxidizes microorganisms, such as bacteria, viruses, and fungi, and other impurities (which are oxidized into end products that are safe for human consumption). Intensive mixing of water produces uniform interactions of the plasma-chemical reaction products with the contaminants (biological and other) that need to be oxidized.

Returning to FIG. 1, the device 100 must be connected a water supply system (such as a tap water faucet, though other water mains can also be used as supply systems) and to a power supply 7. In one embodiment, the power supply can be an AC power supply 15, such as an electric socket. In a further embodiment, the power supply can be a DC power supply, such as a battery, including a rechargeable battery. When the device 100 is turned on, the microcontroller control unit 9 performs tests to check the status of sensors, and if the results of the tests are satisfactory, opens the solenoid valve 2 for supplying water to internal components of the device 100.

In parallel with the opening of the solenoid valve 2, the microcontroller control unit 9 delivers a control signal a high-voltage nanosecond pulse generator 8, which in turn begins the generation of high-voltage nanosecond pulses that are applied to a plurality of pin electrodes 26 of a corona discharge reactor 6, which ignite a corona discharge. In one embodiment, the pulsed discharges have a dU/dt ratio (which describes rate of change of voltage with respect to time and is also referred to as dv/dt ratio) of at least 500 Volts per 1 nanosecond, and preferably 1-3 kV per 1 nanosecond, though other values are possible. In one embodiment, the amplitude of the pulse discharge is in the range from 10 kV to 13 kV. In one embodiment, the number of the pin discharge electrodes 26 is between 12 and 100, though in a further embodiment other numbers of electrodes are possible. The amount of water that needs to be processed by the device per hour is 50 liters per hour-1000 liters per hour (such as measured in Liters/Hour), though in a further embodiment, other amounts of water are possible. In addition to the pin discharge electrodes, the reactor 6 further includes an earth (ground) solid electrode that protects a user from shock hazard. The microcontroller control unit 9 monitors using a current sensor 10 the current applied to the discharge electrodes, which should not exceed the value from 2 to 5 microamperes for a single electrode, in order to prevent the transition of the corona discharge to an arc. After about 5 minutes after the ignition of the corona discharge (though in a further embodiment, other time intervals are possible), the water treatment chamber 5 is filled with water to a permissible level that is confirmed by a level sensor 11—the level can be pre-set, though other ways to set the level of water that the water treatment chamber is filled to are possible. The time to fill with water the processing and mixing chamber 5 is determined by the design dimensions of the device 100 and can be in the range from 1 minute (for the device 100 with a capacity of 100 liters per hour) to 10 minutes (for a device 100 with a capacity of 500 liters per hour). When water level sensor 11 senses that the permissible water level in the chamber 5 is achieved or exceeded, the sensor 11 signals the microcontroller 9 to shut off the inlet solenoid valve 2 and turns off the water supply at the inlet of the device 100. Due to the cavitation processes performed in the ejector-cavitator 3, the water enters the processing and mixing chamber 5 in the form of a water-air mixture under pressure higher than the atmospheric pressure, which causes intensive mixing of water in the chamber 5.

The intensive mixing of water in chamber 5 creates saturated water vapor in the space 12 above the water, with the water vapor being sucked into the reactor 6 through the holes 22 connecting the reactor 6 and chamber 5 due to the pressure in the reactor 6 being less than the pressure in the chamber 5. FIG. 2 shows the path of passage of water vapor from the treatment chamber 5 through the discharge reactor 6 and then through the ejector 3 back to the chamber 5. This cycle is repeated throughout the operation of the device, so the water is constantly treated with products of the chemical-plasma reaction described below, including hydroxyl radicals.

In the reactor 6, plasma-chemical processes shown with reference to FIG. 2 occur due to the corona discharge being generated by the electrodes of the reactor 6. As the corona discharge is generated among the water vapors ("water mist") that enter the reactor 6 from the chamber 5, with the water mist being significantly more conductive than air, the corona discharge is generated at a significantly less voltage than would be necessary if no water mist was present.

Initial products of the corona discharge in the water mist are ozone and OH·H·, the hydroxyl radical and the hydrogen radical. In particular, under the influence of corona discharge, electro-chemical bonds are broken in water molecules. The reaction that leads to the formation of the hydrogen and hydroxyl radicals is described as: e+H2O→H+OH+e. OH radicals formed in reactor 6.

As many compounds do not react with ozone, the device 100 is designed to maximize the generation, duration of activity, and extraction of hydroxyl radicals. Generally, hydroxyl radicals are likely to be destroyed almost as soon as generation due to encountering other hydroxyl radicals. The device 100 allows to extend the life of a hydroxyl radical to around 1 second, which is enough about 50% of the time to extract the hydroxyl radical from the reaction chamber 6 and into the water that needs to be treated. Due to the reduced pressure P' created by the ejector 3, the hydroxyl radicals constantly enter along with the inlet air-water flow into the treatment chamber 5.

The ozone generated is used to extend the life of the hydroxyl radicals. In particular, the hydroxyl radicals primarily interact with each other and not with ozone, thus preventing their destruction. Further, the hydrogen radicals also interact with ozone, which transforms the hydrogen radicals into the hydroxyl radicals. Thus, only the hydroxyl radicals and water molecules remain in the gas phase, which through the interaction with ozone, can avoid destruction, but continue transitioning from one to another·⇔·OH HO2. Thus, the radicals are dynamically maintained, with the ozone being generated by the corona discharge being used to replenish their concentration.

Maintaining the ignited corona discharge consumes significantly less power than would be necessary for a significant generation of ozone from the corona reaction as the amount of the ozone generated is directly proportional to the power used to create the corona discharge. As the amount of power that is used by the device after the ignition of the corona discharge is only enough to maintain the corona discharge, no significant amount of ozone is generated by the corona discharge and the ozone that does get generated is used to maintain the hydroxyl radical concentration as described above.

When inside the treatment chamber, due to the intensive mixing caused by the pressure at which the water with the added hydroxyl radicals is delivered, the hydroxyl radicals enter into oxidative reactions with contaminants in the water. Since the oxidative capacity of OH radicals is about $10^3$ times greater than that of ozone, the efficiency of water purification is very high. The water 16 from the treatment in the mixing chamber 5 enters the output of the apparatus through a drain fitting installed on the housing 17 of the device, exiting the device 100 through the output 23.

Figure 3:
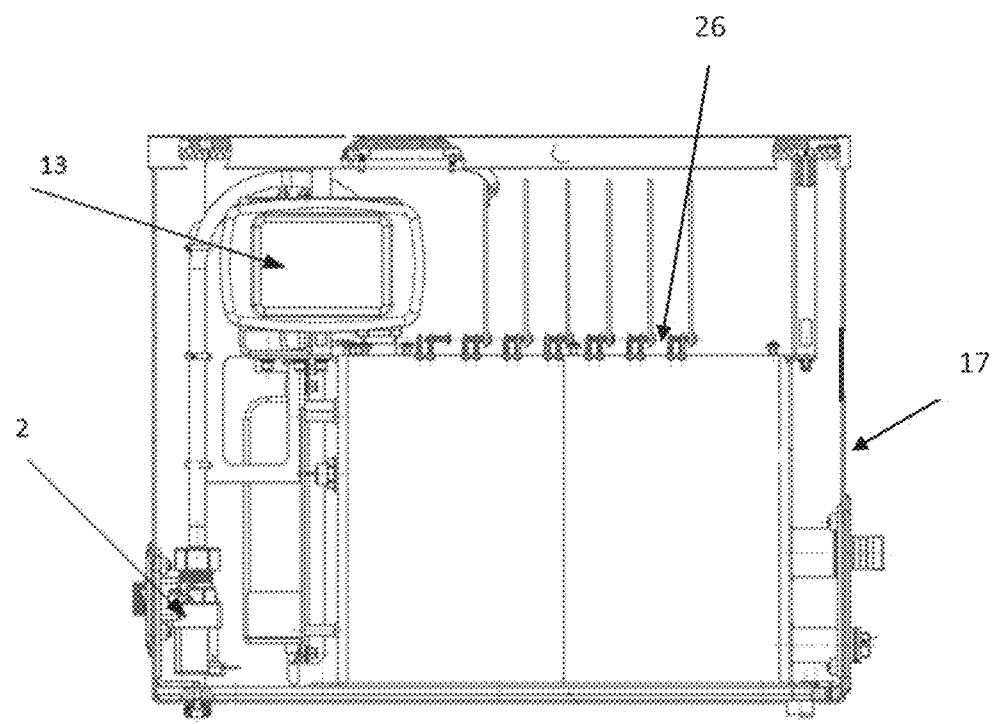
FIGS. 3 and 4 show two views of the internal components of the device of FIG. 1 in accordance with one embodiment.
Figure 4:
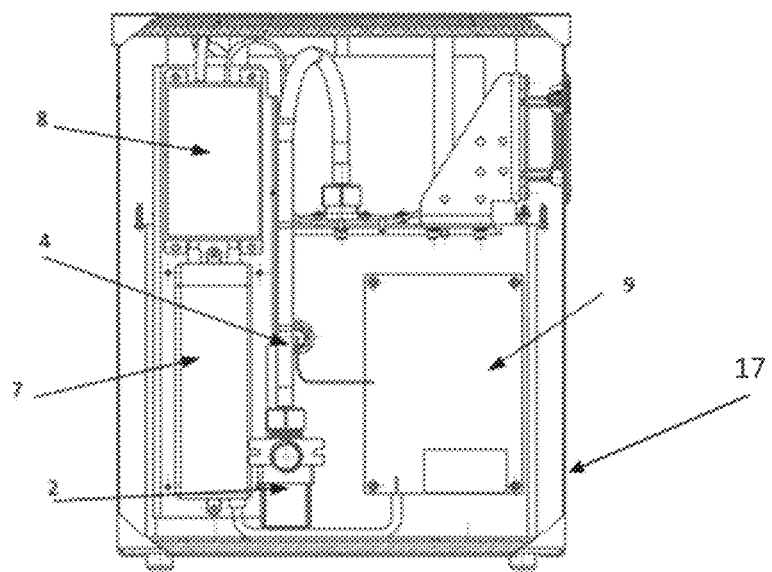
Figure 6:
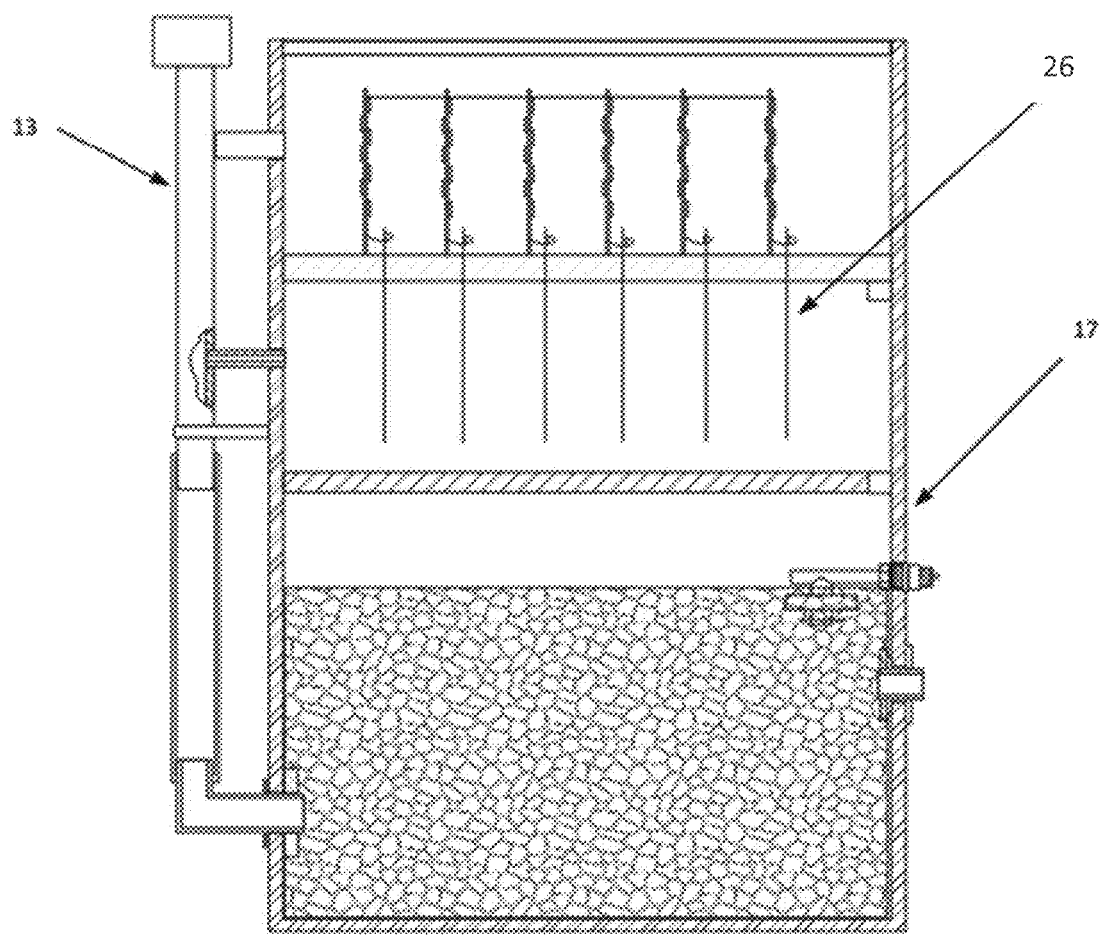
FIG. 6 is a diagram showing a partial cross-section of the device 100 of FIG. 1 in accordance with one embodiment.

The device 100 can be controlled in a plurality of ways. For example, the device 100 can include an information display 13 showing the operating modes of the device 100, as can be seen with reference to FIG. 3, with FIGS. 3 and 4 showing two views of the internal schematics of the same device 100. FIG. 6 is a diagram showing a partial cross-section of the device 100 of FIG. 1 in accordance with one embodiment. Commands for the operation of the device can be selected through the display 13 (such as through touch screen technology, though other ways to interact with the display are possible).

Figure 5:
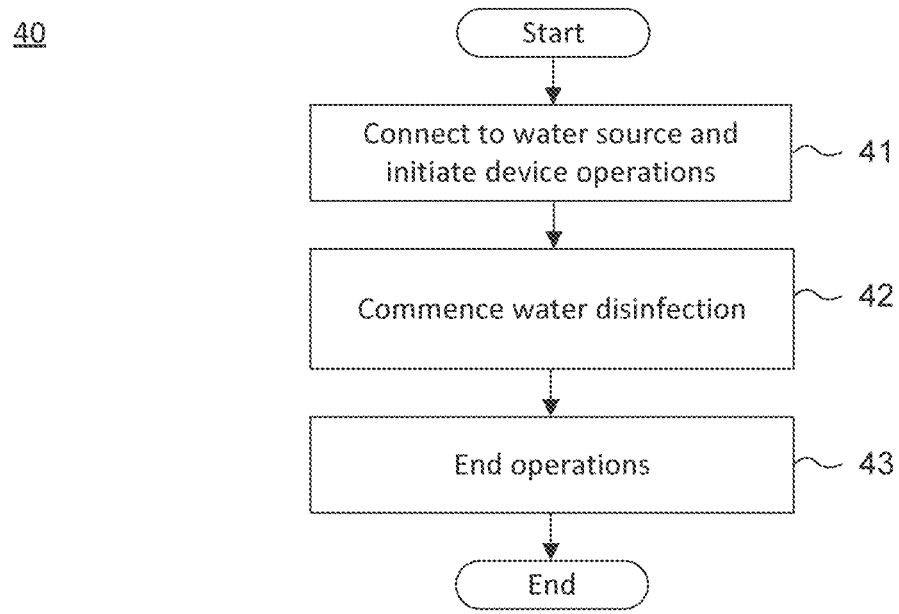
FIG. 5 is a flow diagram illustrating a method of operations of the device of FIG. 1 in accordance with one embodiment.

Operating the device 100 can also be represented as a method 40. FIG. 5 is a flow diagram illustrating a method 40 of operations of the device 100 in accordance with one embodiment. The device is connected to a source of water, and optionally, an external source of oxygen and an external source of power, and user input is entered into the device (such as through the information terminal) to initiate operations (step 41). The operations of the device 100 are commenced as described above, including testing of the sensors, ignition of the corona discharge, the filling of the treatment and mixing chamber 5 with water, and a continued cycle of addition of the products of the plasma-chemical reaction into the water (step 42). The operations are ended through one or more of a user command or a disconnection of the device from a water source (step 43), ending the method 40.

The numbering of the elements in the FIGURES is as follows.

1. Filter for water purification from mechanical contaminants
2. Solenoid valve for water supply to the apparatus
3. An incoming water cavitator that mixes water with a hydroxyl radicals obtained in reactor 6 and delivered by ejector 4.
4. An ejector that ensures the absorption of hydroxyl radicals from reactor 6.
5. The chamber in which the mixing and processing of the source water takes place.
6. Corona discharge reactor
7. A power supply generated by the necessary voltages for the operation of the device.
8. Generator of high-voltage nanosecond pulses for obtaining corona discharge on electrodes in the reactor.
9. The control microcontroller unit, which generates the necessary control signals for the operation of the device.
10. The current sensor, which is used to monitor the discharge current in the corona discharge reactor, is necessary to prevent the transition of the corona discharge to the arc discharge.
11. The water level sensor in the treatment tank serves to protect against overflow and maintain a constant set water level.
12. A cavity with saturated water vapor in the water treatment tank 5, which is structurally connected to the reactor by means of several holes for the ingress of saturated vapors into the corona discharge area.
13. Information display showing the operating modes of the device.
14. Main water line through which the water enters the device.
16. Water treated by the device.
17. The housing of the device.
22. Interface connecting reactor and mixing chamber 5.
26. Electrodes While the invention has been particularly shown and described as referenced to the embodiments thereof, those skilled in the art will understand that the foregoing and other changes in form and detail may be made therein without departing from the spirit and scope.

What is claimed is:

1. A device for hydroxyl-radical-based water disinfection, comprising:

an ejector into which water that comprises contaminants enters under a pressure and with a speed and which accelerates the water to a further speed greater than the speed, wherein the accelerated water creates a region of a further pressure at a boundary of flow of the accelerated water and wherein the further pressure is lower than the pressure under which the water enters the ejector, a reaction chamber comprising a plurality of electrodes which produce a corona discharge upon an application of high voltage nanosecond duration pulses to the electrodes, wherein the corona discharge produces plasma-chemical reaction products comprising hydroxyl radicals upon encountering a water vapor that enters the reaction chamber through a reaction chamber interface to a mixing chamber, wherein a third pressure in the reaction chamber is greater than the further pressure, and wherein the reaction chamber is interfaced to the lower pressure region and the plasma-chemical reaction products enter the accelerated water through the interface to the lower pressure region; and the mixing chamber interfaced to the ejector, the reaction chamber, and to an outlet, wherein at least a portion of the contaminants encounter at least some of the reaction products in the mixing chamber and the at least some reaction products at least partially oxidize the encountered contaminants, and wherein the water within the mixing chamber forms the water vapor that enters the reaction chamber through the reaction chamber interface, and wherein the water with the oxidized contaminants exits through the outlet.

2. A device according to claim 1, further comprising:
a pre-treatment filter that filters out from the water those of the contaminants that are undissolved in the water, and
a valve that the water encounters after passing through the pre-treatment filter and that controls access of the water to the ejector.

3. A device according to claim 2, further comprising:
a pulse generator configured to apply the high voltage nanosecond duration pulses to the electrodes;
a microcontroller control unit interfaced to the pulse generator and the valve, the microcontroller control unit configured to:
command the pulse generator to ignite the corona discharge via the application of the high voltage nanosecond duration pulses to the electrodes;
following an expiration of a predefined time period since the ignition, command the valve to allow the access of the water to the ejector.

4. A device according to claim 3, further comprising:
a current sensor interfaced to the microcontroller control unit and configured to sense a current of the high-voltage nanosecond duration pulses; and
the microcontroller control unit further configured to compare the sensed current to a threshold and issue a command to the pulse generator based on the comparison.

5. A device according to claim 4, wherein the threshold is 2 microamperes to 5 microamperes for a single one of the electrodes.

6. A device according to claim 3, further comprising:
a water level sensor interfaced to the microcontroller control unit and configured to measure a level of the water within the mixing chamber and to send a signal to the microcontroller control unit upon the level reaching a predefined threshold; and
the microcontroller control unit further configured to control the valve to shut off the access of the water to the ejector upon receipt of the signal.

7. A device according to claim 3, further comprising:
one or more sensors;
the microcontroller control unit configured to check a status of the sensors prior to commanding the valve to allow the access of the water to the ejector.

8. A device according to claim 1, wherein a dv/dt ratio of each of the high voltage nanosecond duration pulses is at least 500 Volts per 1 nanosecond.

9. A device according to claim 1, wherein a dU/dt ratio of the high voltage nanosecond duration pulses is 1 kV to 3 kV per 1 nanosecond.

10. A device according to claim 1, wherein an amplitude of each of the high voltage nanosecond duration pulses is 10 kV to 13 kV.

11. A device according to claim 1, wherein a number of the electrodes is between 12 and 100 and the reaction chamber further comprises a ground electrode.

12. A device according to claim 1, further comprising:
a further chamber comprised within the ejector in which bubbles form in the water and into which the water enters under a fourth pressure that is lower than the pressure under which the water enters the ejector and higher than the further pressure, wherein upon entering the mixing chamber at least some of the bubbles rise to a top of the liquid to promote the formation of the water vapor.

13. A device according to claim 12, further comprising:
an outlet channel comprised in the ejector comprising a constant area section into which the water mixed with the bubbles enters under a still further pressure that is greater than the pressure, the outlet channel further comprising a diffuser section that widens towards an end from which the water exits the ejector and in which the third pressure drops as the water flows towards the end.

14. A device according to claim 12, wherein the lower pressure region is formed within the further chamber.

15. A device according to claim 1, wherein the plasma-chemical reaction products further comprise hydrogen radicals and ozone and reactions between the hydrogen radicals and the ozone replenish the hydroxyl radicals.

16. A method for hydroxyl-radical-based water disinfection, comprising:
providing into an ejector water that comprises contaminants under a pressure and with a speed and accelerating with the ejector the water to a further speed greater than the speed, wherein the accelerated water creates a region of a further pressure at a boundary of flow of the accelerated water and wherein the further pressure is lower than the pressure under which the water enters the ejector;
producing in a reaction chamber comprising a plurality of electrodes a corona discharge by applying high voltage nanosecond duration pulses to the electrodes, wherein the corona discharge produces plasma-chemical reaction products comprising hydroxyl radicals upon encountering a water vaper that enters the reaction chamber through a reaction chamber interface to a mixing chamber, wherein a third pressure in the reaction chamber is greater than the further pressure, and wherein the reaction chamber is interfaced to the lower pressure region and the plasma-chemical reaction products enter the accelerated water through the interface to the lower pressure region; and
mixing the water with the plasma-chemical reaction products in the mixing chamber interfaced to the ejector, the reaction chamber, and to an outlet, wherein at least a portion of the contaminants encounter at least some of the reaction products in the mixing chamber and the at least some reaction products at least partially oxidize the encountered contaminants, and wherein the water within the mixing chamber forms the water vapor that enters the reaction chamber through the reaction chamber interface, and wherein the water with the oxidized contaminants exits through the outlet.

17. A method according to claim 16, further comprising:
filtering from the water those of the contaminants that are undissolved in the water using a pre-treatment filter; and
controlling access to the ejector of the water that has passed through the pro-treatment filter using a valve.

18. A method according to claim 17, wherein the high voltage nanosecond duration pulses are applied to the electrodes using a pulse generator, further comprising:
commanding, by a microcontroller control unit interfaced to the pulse generator and the valve, the pulse generator to ignite the corona discharge via the application of the high voltage nanosecond duration pulses to the electrodes;
following an expiration of a predefined time period since the ignition, commanding by the microcontroller control unit the valve to allow the access of the water to the ejector.

19. A method according to claim 18, further comprising:
sensing, by a current sensor interfaced to the microcontroller control unit, a current of the high-voltage nanosecond duration pulses; and
comparing by the microcontroller control unit the sensed current to a threshold and issuing a command to the pulse generator based on the comparison.

20. A method according to claim 19, further comprising:
measuring, by a water level sensor interfaced to the microcontroller control unit, a level of the water within the mixing chamber, and sending a signal to the microcontroller control unit upon the level reaching a predefined threshold; and
controlling by the microcontroller control unit the valve to shut off the access of the water to the ejector upon receipt of the signal.

* * * * *